(No Model.)

C. P. SHERMAN.
NUT LOCK.

No. 490,458. Patented Jan. 24, 1893.

WITNESSES_
Carroll J. Webster.
Gertrude Gifford.

INVENTOR_
Charles P. Sherman
By William Webster
Atty

UNITED STATES PATENT OFFICE.

CHARLES P. SHERMAN, OF TOLEDO, OHIO, ASSIGNOR, BY DIRECT AND MESNE ASSIGNMENTS, TO THE SHERMAN NUT LOCK COMPANY, OF DETROIT, MICHIGAN.

NUT-LOCK.

SPECIFICATION forming part of Letters Patent No. 490,458, dated January 24, 1893.

Application filed April 27, 1891. Serial No. 390,556. (No model.)

*To all whom it may concern:*

Be it known that I, CHARLES P. SHERMAN, of Toledo, county of Lucas, and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to nut locks, and is designed to be placed upon the threaded end of the bolt in rear of the nut in a position to be caused to impinge upon and into the threads of the bolt at right angles to the bolt and obliquely of the threads.

The object of the invention is to provide an inexpensive lock for the nut, that shall be capable of being immovably secured upon the bolt without injury to the thread, and when desired can be removed without injury to the nut lock.

The invention consists in providing a washer, having a central perforation of less diameter than the bolt upon which it is to be used, the wall of the perforation being formed with cut away openings which communicate with the central perforation to allow of forming the washer into a concave form of sufficient degree to expand the central opening to a diameter to allow of passing the washer upon the bolt, with the apex of the concavity fitting closely against the outer face of the nut, and crossing the thread of the bolt at an oblique angle, so that when the washer is flattened against the face of the nut and in a plane parallel therewith, the openings of the wall surrounding the central openings will contract to allow the projections intermediate the same to be forced into the threads of the bolt, and when the washer is forced to its original concavity the expansion of the openings to their original size, shall withdraw the projections from impinging into the threads.

Figure 1:
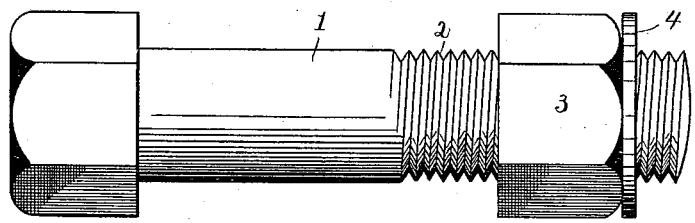
Figure 2:
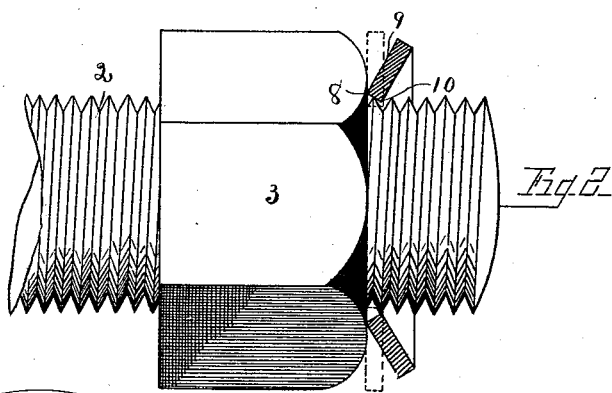
Figure 3:
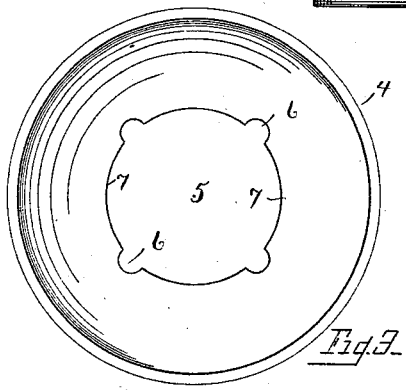
Figure 4:
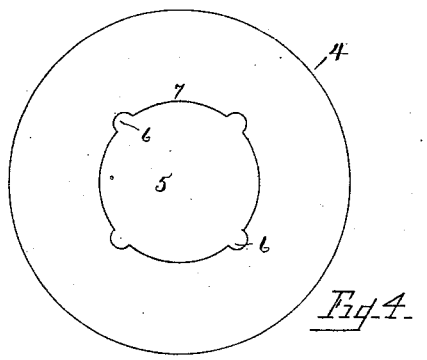

In the drawings, Figure 1 is a side elevation of a bolt provided with my improved lock, the same being shown in fixed engagement with the bolt. Fig. 2 is a like view of a sufficient portion of the bolt to illustrate my invention, the washer being shown in full lines as concaved and in position to be secured upon the bolt against the nut, and in dotted lines as so secured by being forced to a plane parallel therewith. Fig. 3 is a plan view of the concave side of the washer, showing the area of the openings concentric to and communicating with the central opening, when the washer is concaved, and Fig. 4 is a plan view of the washer, showing the contracted area of the openings when the concavity of the washer is removed by forcing the same to a plane parallel with the nut.

1, designates the bolt, having a threaded end 2, upon which the nut 3 is run.

4, designates the nut lock, which for the purpose of description, I will call the washer, and is formed preferably circular, although it may be rectangular, hexagonal or any desired shape. Centrally of the washer is formed an opening 5 of less diameter than that of the thread over which it is to pass. Centrally of the central opening 5 are radial openings 6, formed by removing a portion of the metal from the wall surrounding the opening 5, whereby the openings 6 are in communication with the opening 5.

In order to expand opening 5 sufficiently to permit the washer to be placed upon the end of the bolt, the washer is dished or concaved, whereby by the expansion or spreading of the sides of openings 6, the intermediate metal 7 is allowed to also expand to a degree to enlarge the opening 5 the desired size, when after the nut is screwed to place, the washer is placed upon the bolt with the apex 8 of the convex-side 9, fitting snugly against the outer face of the nut, (see Fig. 2) where it will be observed that the washer crosses the thread at an oblique angle, and also that the angled edge 10 formed on the concaved side of the washer is ready to first impinge upon, and second embed into the metal of the thread as the convex side of the washer is brought to a plane parallel with the outer face of the nut, as shown in dotted lines.

By reference to Figs. 3 and 4 it will be seen that the radially disposed openings 6 are of greater area when the washer is dished than when flattened. This contraction and expansion regulates the action of the intermediate sections 7, allowing the same to approach or recede from toward a central point to wit: the center of the opening 5. It then necessarily follows that the washer is not only securely locked by reason of the sections 7 being embedded into the thread, but that to re-concave the washer is to expand the openings and withdraw the sections, thereby allowing of removal of the washer without injury to the same or to the thread of the bolt.

In operation, the convex-side of the washer being placed directly against the outer face of the nut, the bearing against the nut is equal upon all sides, and as the projections 7 bear equally upon all sides of the thread, it is evident that as the washer is forced to a plane parallel with the nut, it is without longitudinal movement of the impinging or locking portion of the nut upon the bolt, and consequently without the possibility of mutilating the thread.

What I claim is,

In a nut lock, the combination with a threaded bolt, of a nut screwed thereon, and a concavo-convex washer arranged upon the bolt on top of the nut, with the apex against the nut said washer being provided with a series of notches in the central opening, and being adapted to be flattened upon the upper face of the nut whereby the washer impinges against the bolt and holds the nut down.

In testimony that I claim the foregoing as my own I hereby affix my signature in presence of two witnesses.

CHARLES P. SHERMAN.

Witnesses:
WILLIAM WEBSTER,
CARROLL J. WEBSTER.